US006604164B1

(12) United States Patent
Vadasz

(10) Patent No.: US 6,604,164 B1
(45) Date of Patent: Aug. 5, 2003

(54) COMPUTER

(75) Inventor: Istvan Vadasz, Munich (DE)

(73) Assignee: Force Computers GmbH, Neubiberg (DE)

( * ) Notice: Subject to any disclaimer, the term of this patent is extended or adjusted under 35 U.S.C. 154(b) by 378 days.

(21) Appl. No.: 09/637,392

(22) Filed: Aug. 11, 2000

(30) Foreign Application Priority Data

Aug. 13, 1999 (DE) .......................................... 199 38 429

(51) Int. Cl.[7] .............................................. G06F 13/00
(52) U.S. Cl. ........................ 710/306; 710/305; 710/301
(58) Field of Search ................................. 710/300–304, 710/305–315

(56) References Cited

U.S. PATENT DOCUMENTS

| 4,654,784 A | | 3/1987 | Campanini | |
|---|---|---|---|---|
| 4,777,615 A | * | 10/1988 | Potash | ......................... 710/300 |
| 5,225,967 A | * | 7/1993 | Carteau | ....................... 361/775 |
| 5,674,077 A | * | 10/1997 | Flaig et al. | .................... 439/63 |
| 5,852,725 A | * | 12/1998 | Yen | ............................ 710/301 |
| 5,991,844 A | | 11/1999 | Khosrowpour | |
| 6,195,717 B1 | * | 2/2001 | Henderson et al. | ......... 710/312 |
| 6,473,822 B1 | * | 10/2002 | Nakamatsu et al. | ........ 710/300 |

FOREIGN PATENT DOCUMENTS

| EP | 0410861 A1 | 1/1991 |
|---|---|---|
| WO | WO 89/07349 | 8/1989 |

* cited by examiner

*Primary Examiner*—Sumati Lefkowitz
(74) *Attorney, Agent, or Firm*—Townsend, Townsend & Crew LLP

(57) ABSTRACT

Disclosed is a computer having a plurality of adapter cards which are insertable in adjacent bus segments, which are routed interleaved in the middle of a backplane and standard connectors are provided with connections alternating between the two bus segments. Both bus segments are connected to each other by a bridge circuit which includes at least one CPU adapter card. The invention is characterized by two bridge members each of which has an I/O unit and a CPU unit which are fixedly connected to each other. They are insertable in the bus segments with the I/O units inserted in one bus segment and the CPU units inserted in the other bus segment.

12 Claims, 1 Drawing Sheet

COMPUTER

BACKGROUND OF THE INVENTION

The present invention generally relates to a computer with several insert cards or adapter cards (hereafter referred to as "adapter cards").

Computers with several adapter cards are known. They have bus segments that are adjacent to each other and into which the adapter cards are placed. Any adapter cards with the appropriate bus specifications can be inserted into the insertion slot, and at least one adapter card must have a CPU or a computer module. This adapter card is designated as the host, while the other adapter cards are designated utility adapter cards or blind adapter cards, which are configured as needed to accommodate various uses or applications.

A bus system that is increasingly widely used, representing a further development of the PCI-bus, is the so-called compact PCI-bus. This bus has, according to standards, eight insertion slots, so that by employing one CPU, seven utility insertion slots remain. This can be too few for any given use or application. It has therefore been proposed that the bus speed be reduced to realize a greater number of insertion slots with longer bus segments. This, however, is undesirable since it reduces the throughput of the system.

CPU units have already been developed which require two insertion slots, each serving a separate bus segment, since in such a configuration 14 utility insertion slots can be utilized. This solution, however, does not permit hot-swap operation and provides no redundancy.

Demanding applications frequently require an especially high availability of the computer. For such applications, two CPU adapter cards are often installed, such that upon failure of one of them the other card can perform the central computing functions alone.

To combine high availability and correspondingly high failure protection with an increased number of available insertion slots, the use of a bridge circuit has been proposed. In this proposal, a bridge board combines two CPU cards with two I/O-units that are offset with respect to the surface of the motherboard or the backplane, which overlap both bus segments.

Irrespective of how the CPU cards and the I/O cards are arranged over the four insertion slots of the daughterboard and the opposing insertion slots in the motherboard, exceptional demands are placed on the I/O cards, which must perform a number of additional functions when the corresponding CPU cards fail. Both CPU cards could in fact be arranged on one segment and the I/O input cards on the other segment, which would be a less complex implementation. However, in normal use such a solution is worse because a symmetric load for both bus segments cannot be attained, and special additional signal lines are required that do not conform to standards, raises compatibility problems.

In view of these difficulties, it has also been proposed to replace both I/O cards with CPU cards, resulting in four CPU cards. This solution provides a very good data throughput and a symmetric load distribution. On the other hand, it is the most expensive feasible solution.

BRIEF SUMMARY OF THE INVENTION

It is therefore a main objective of the invention to provide a computer which has several adapter cards that are insertable in a plurality of adjacent bus segments, which combines high availability with an increased number of available utility insertion slots at favorable cost.

According to one aspect of the invention, high availability is attained by hard-wiring an I/O-unit and a CPU-unit in such a way that the combined units can be removed and replaced with another one while the computer is in operation. This is often referred to as hot-swapping.

To achieve the configuration of the invention, the signal lines of both bus segments in the motherboard/backplane are routed in an overlapping (interleaved) manner at the fringes of both bus segments. Thus, if the bus segments are identified as "A" and "B", then the connectors, that is, the connection elements for inserting the cards in the motherboard, are linked in the motherboard/backplane as follows:

AAAAAAABABBBBBBB.

Preferably, identical connectors can be used at all positions of the bus elements.

The hard-wiring and a mechanically well-supported slide guide of a bridge member of this type do not guarantee that the contacts of the I/O-unit and CPU-unit in the backplane release simultaneously or, during insertion, make simultaneous contact. The chronological sequence of a hot-swap is simplified by providing an individual hardware connection to the motherboard for each unit. However, the beginning and the end of the hot-swap process are determined for the bridge member as a whole.

According to the invention, two independent bridge members are provided, each forming an adapter card with an I/O-unit or CPU-unit and internally electrically linked through a daughterboard. In accordance with the invention, the I/O-unit of one bridge member is inserted in one bus segment, but the CPU-unit of the same bridge member is inserted in the other bus segment. The I/O-unit of the other bridge member is also linked with the one bus segment, and the CPU-unit of the other bridge member is also linked with the other bus segment.

In this manner, standard signals and connections for compact PCI-buses can be used, which represents a particular advantage of the invention. It is possible without further difficulty to use separate address spaces for each bus segment. Each CPU communicates with a bus segment so that a very direct realization is possible. Initialization of the two CPUs differs in that one CPU is linked with the appropriate bus segment over an I/O-unit, while the other CPU is linked directly with the appropriate bus segment. This solution provides 12 utility insertion slots and two CPU adapter cards which can be hot-swapped, while signal utilization of the bus lines does not deviate from standards.

The bridge members—in addition to the local system bus—transmit the necessary signals and ensure, when necessary, an energy supply which makes hot-swapping of the CPU and I/O-unit link (bridge member) possible. These links guarantee that the internal current supply of the link is not turned on before both components have been completely inserted. In one embodiment, leading pins are used to provide current from the bridge circuit of the other unit.

The CPU card and I/O card, which are linked across the local bus or a bus circuit, form a structural unit or a bridge member. The connections to both bus segments can be structurally alike and symmetric. In a typical embodiment, the "host" function of both bus segments is provided by the card of the bridge member which contacts both. This allows the separation of the other (inactive) bridge member from both bus segments.

A rearrangement of the host configuration when the roles of the bridge members as host and non-host are exchanged occurs simultaneously on both bus segments. This allows the removal of the bridge member that is configured as non-host (secondary host) from the system by hot-swapping. A bridge member inserted by hot-swapping is pre-set as non-host (secondary host) for both bus segments.

One embodiment of the invention provides that in a particular mode of operation each bridge member becomes a host for a respective bus segment. To support a hot-swap, this mode of operation is switched to the above-mentioned mode of operation and configuration.

Further details, advantages and characteristics of the invention are set forth in the following description of an exemplary embodiment with reference to the drawings.

DETAILED DESCRIPTION OF THE INVENTION

Figure 1:
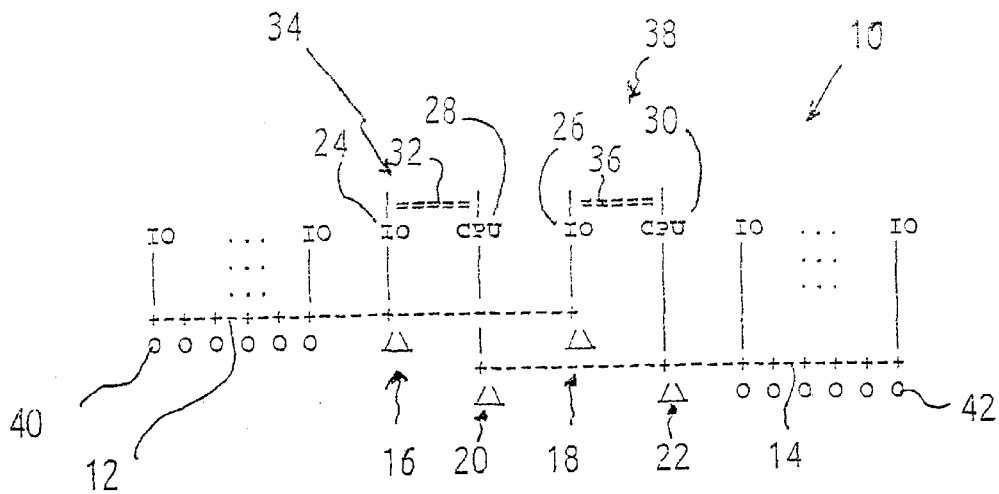
FIG. 1 is a schematic representation of a design for a computer made according to the invention.

The computer 10 schematically shown in FIG. 1 has two adjacent bus segments 12, 14 and each bus segment has eight insertion slots. Even though the two bus segments are shown in FIG. 1 at different levels, it is understood that in practice it is preferred to arrange them at one level and a common backplane. The backplane is made according to multilayer technology so that the signal lines, even though they are in reality on different levels, are nevertheless part of the same board.

Bus segment 12 has two insertion slots 16, 18, which are proximate to bus segment 14. Correspondingly, bus segment 14 has two insertion slots 20, 22, which are proximate to bus segment 12. As viewed from the bus segment 12, insertion slot 16 is on this side of insertion slot 20, while the insertion slot 18 is on the other side. As viewed from bus segment 14, insertion slot 22 is arranged on this side of insertion slot 18, while insertion slot 20 is on the other side.

The two insertion slots 16, 18 are intended for the insertion of I/O-units 24, 26. Insertion slots 20, 22 are intended for the insertion of two CPU-units 28, 30. I/O-unit 24 together with a bridge circuit 32 and CPU-unit 28 constitute a bridge member 34. I/O-unit 26 together with a bridge circuit 36 and CPU-unit 30 constitute the other bridge member 38. The two bridge members 34, 38 are identical to render them interchangeable and simplify their construction. The bridge circuits 32, 36 form a fixed mechanical and electrical connection. In addition, appropriate lateral slip-in guides and internal threaded joints, not shown in the drawings, between the I/O-units and CPU-units assure that each bridge member 34, 38 can simultaneously be inserted as a compact unit in each of the insertion slots and removed from them.

Each bus segment 12, 14 further has six utility insertion slots apiece 40, 42. Additional adapter cards can be inserted in these slots as required for a given application.

Figure 2:
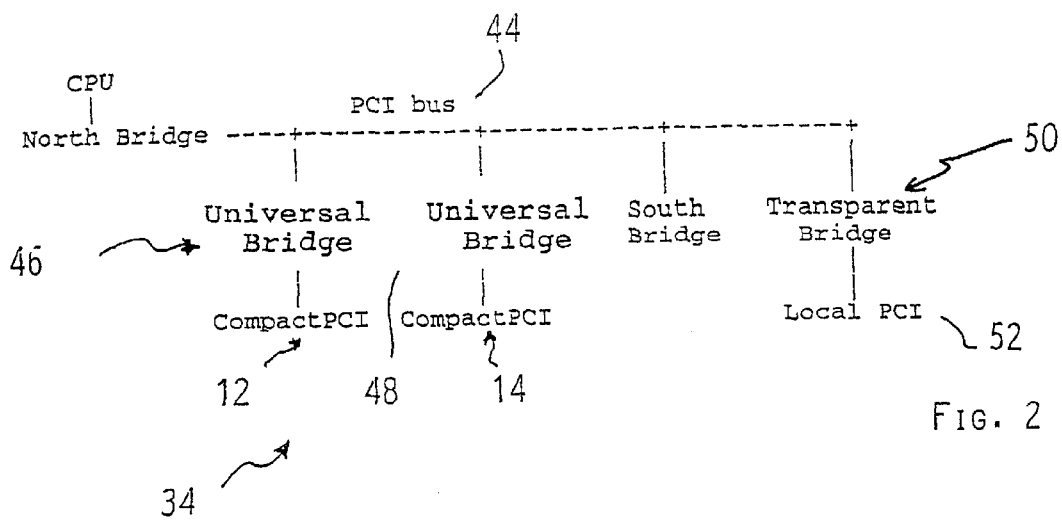
FIG. 2 is the schematic design of a bridge member used in a computer made according to the invention.

FIG. 2 schematically shows the internal design of a bridge member 34. An internal PCI-bus 44 is provided by bridge circuit 32, which forms a link to the CPU-unit or to the I/O-unit over standard circuits often referred to as north bridge and south bridge. The connection to bus segments 12, 14 is formed over customer-specific programmable switching circuits or an ASIC 46, 48. The inserted bus interface must be configurable as host and as non-host. Both bus segments conform to specifications for compact PCI-buses.

In addition, bridge member 34 preferably has a transparent bridge 50 to a local PCI-bus 52. It is understood that in a modified arrangement this transparent bridge and the local PCI-bus can be eliminated.

Even though the exemplary embodiment envisions that the I/O-unit and the CPU-unit are each on an adapter card, it is understood that another form is also possible. It is conceivable, for example, to also cast a bridge member 34 in a compact form so that only the heat sinks needed for the circuits are accessible from the outside. This enhances, the mechanical stability and, as is appropriate for such an embodiment, plug-in contact strips extend out to bus segments 12, 14.

According to the invention, the signal lines for connections which cross each other in the backplane are designed so that grounding surfaces extend between them to prevent crosstalk. The formation of grounding surfaces or paths is conventional for multilayer backplanes.

What is claimed is:

1. A computer having a plurality of adapter cards which are insertable in a plurality of adjacent bus segments, wherein a bridge circuit connects the bus segments to each other and includes at least one CPU adapter card, wherein the bridge circuit includes two dual-slot bridge members each of which has an I/O unit and a CPU unit which are fixed to each other, the dual slot bridge members being insertable in the bus segments, wherein the I/O units are insertable in one bus segment and the CPU units are insertable in the other bus segment, and wherein an overlapping routing of signal lines of the bus segments makes the use of identical connectors at all positions possible.

2. A computer according to claim 1, wherein both bus segments are arranged on a common motherboard which is formed in accordance with a multilayer technology, and in that the units are formed as adapter cards.

3. A computer according to claim 2, wherein one I/O unit and an associated CPU unit are connected to each other by a local bus or a bridge circuit, and wherein means is provided for substantially synchronously inserting the I/O unit and the CPU unit.

4. A computer according to claim 1, wherein an internal current supply for the bridge members is only activated when both units of the dual slot bridge member are fully inserted.

5. A computer according to claim 1, wherein one of the CPU units is configured as a primary host for the associated bus segment and one of the I/O units as a primary host for the other bus segment to provide a high availability or error-tolerant system.

6. A computer according to claim 1, wherein the CPU unit and the I/O unit which form one dual slot bridge member are configured as the active host or primary host of the associated bus segment while the other dual slot bridge member is configured as non-host.

7. A computer according to claim 1, wherein each bus segment is constructed as a CompactPCI bus and each I/O unit is connected with a CPU unit as an input/output unit via a bridge circuit so that the resulting bridge member can each serve one bus segment as host or non-host via a standard interface.

8. A computer according to claim 1, wherein the dual slot bridge elements are identically constructed and mutually interchangeable.

9. A computer according to claim 1, wherein the dual slot bridge members are arranged at the front side of a motherboard or a back plane carrying the bus segments.

10. A computer according to claim 1, wherein PCI-to-PCI bridge chips are used for the I/O units, wherein the bus frequency remains unchanged.

11. A computer according to claim 1, wherein a local architecture of the CPU unit assures like connections to the bus segments.

12. A computer according to claim 1, wherein in a selected operating mode each dual slot bridge member functions as a host for one bus segment so that the computer is switchable in this operating mode to another operating mode in which the bridge member functions as a non-host and can be hot-swapped.

* * * * *